Patented Dec. 31, 1940

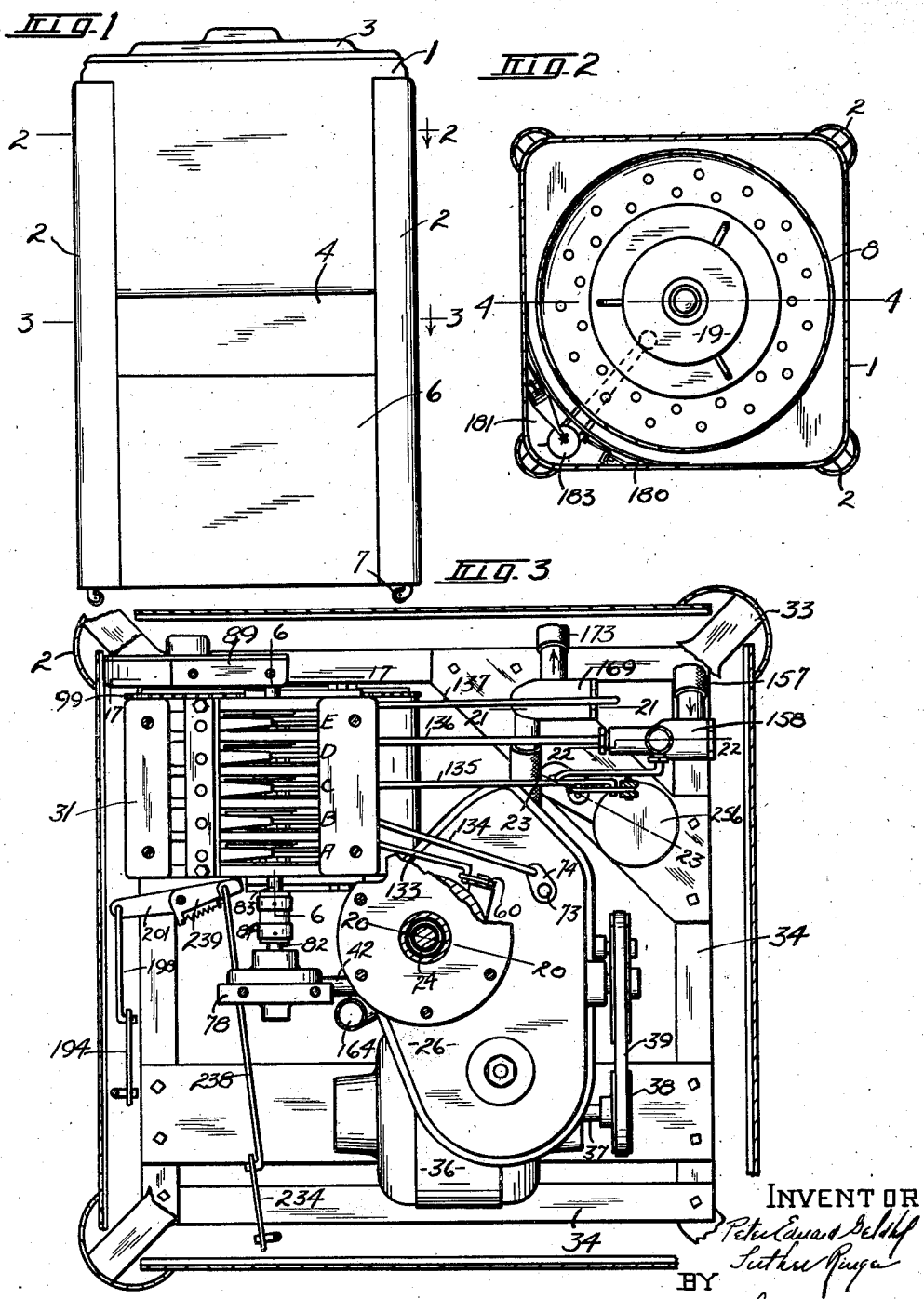

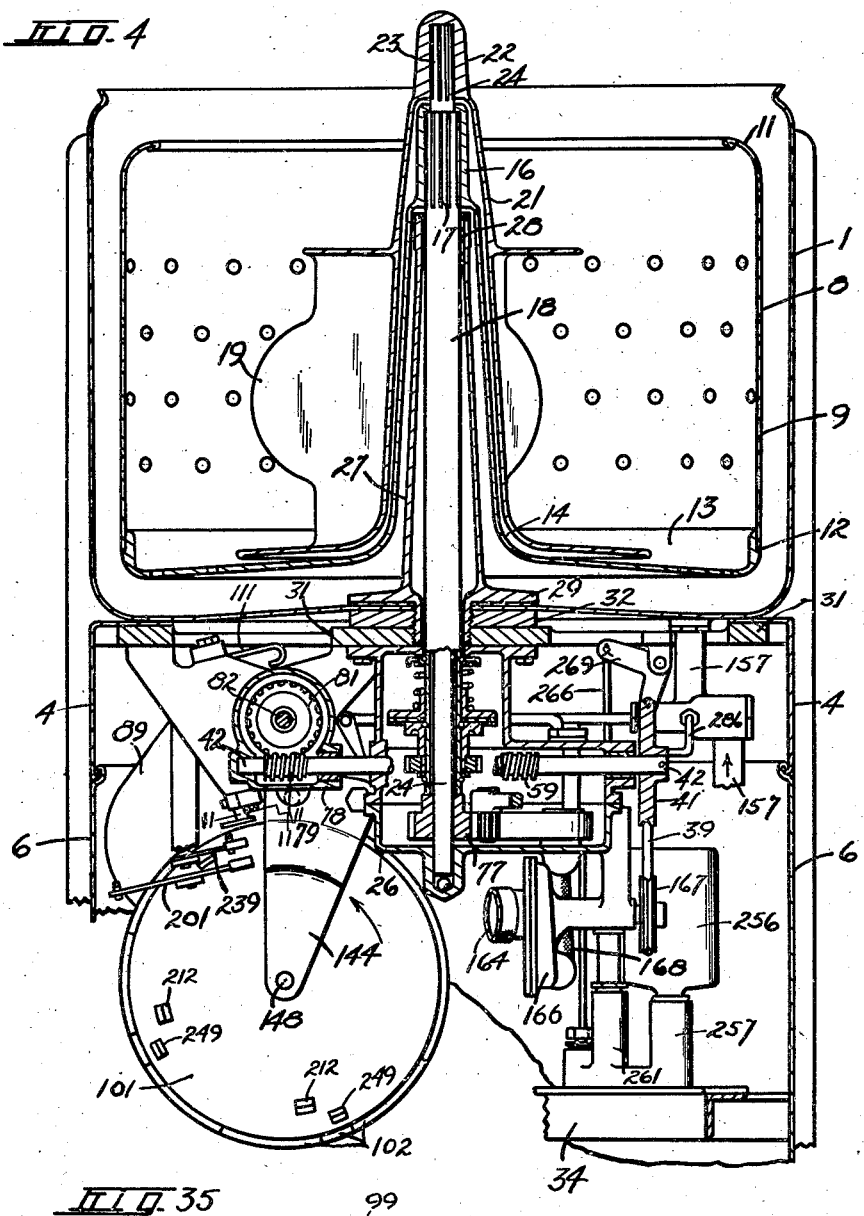

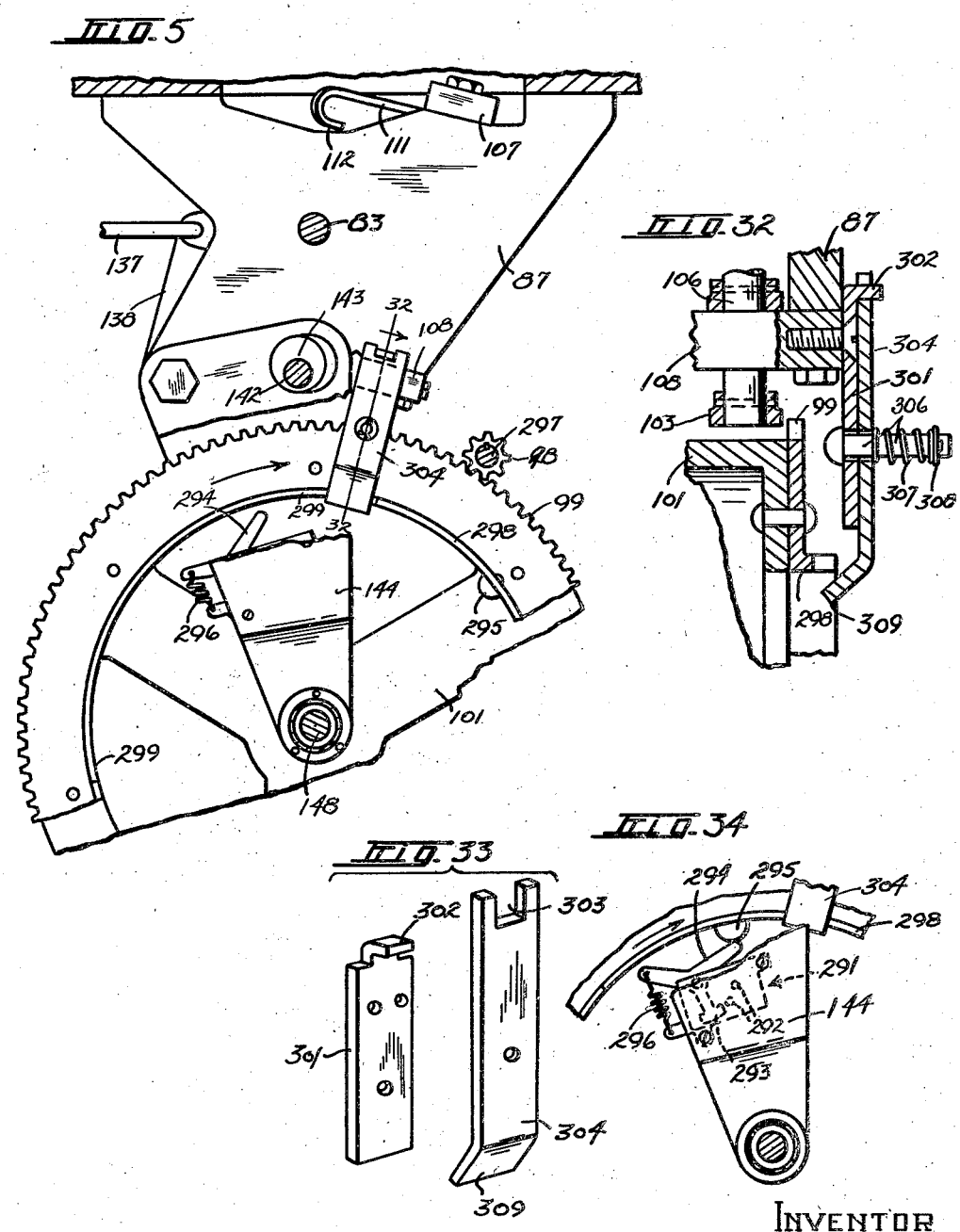

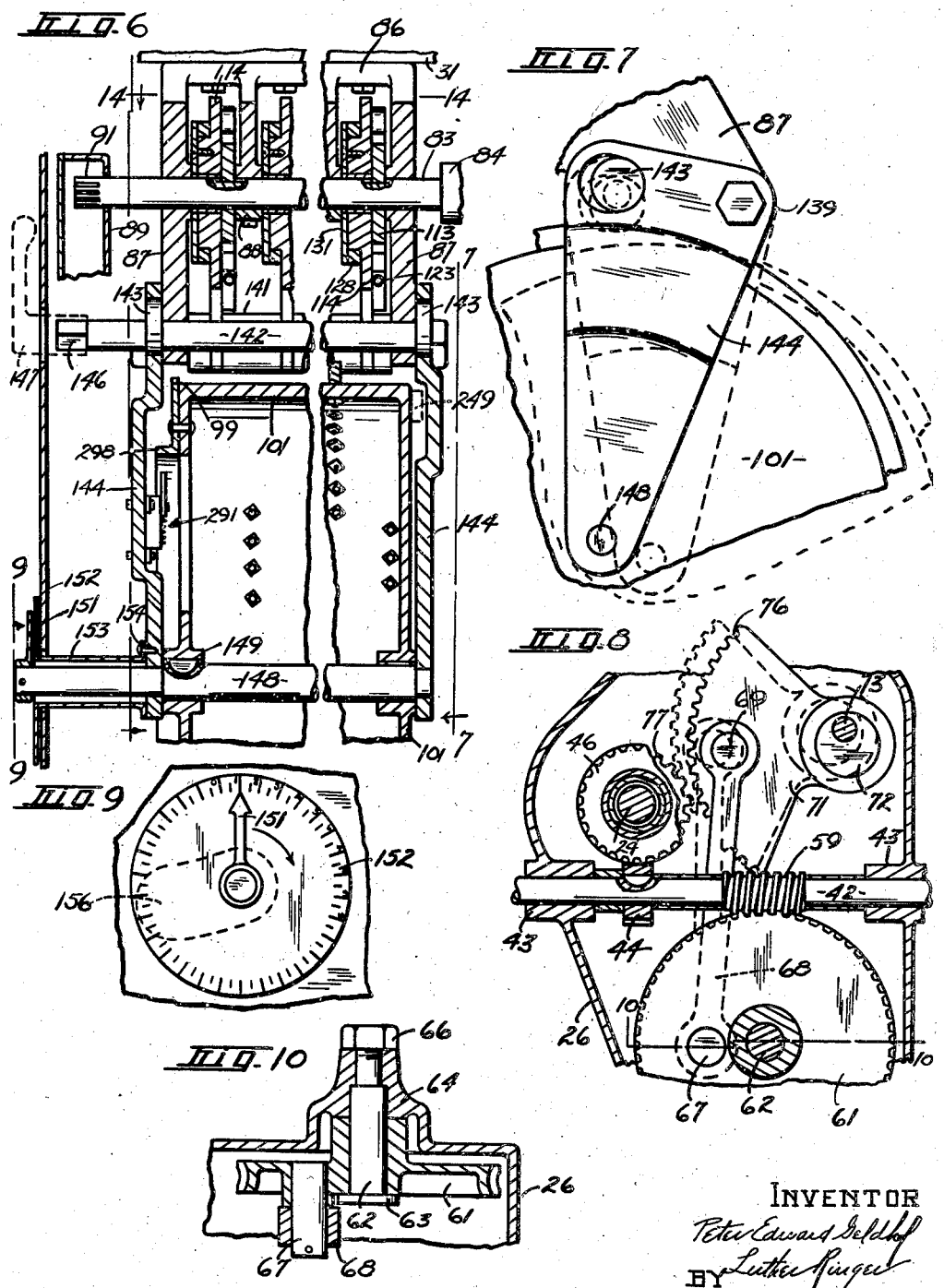

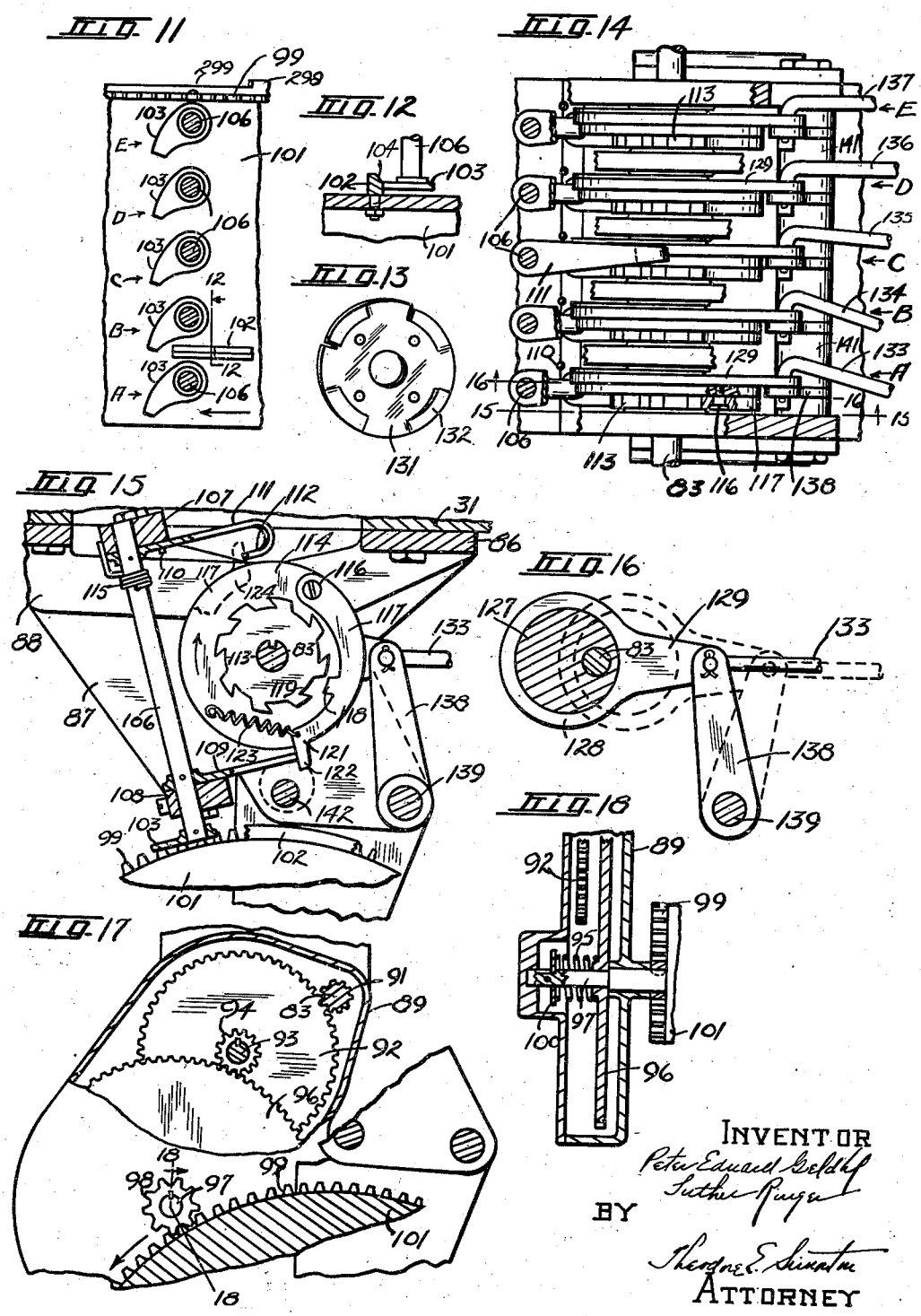

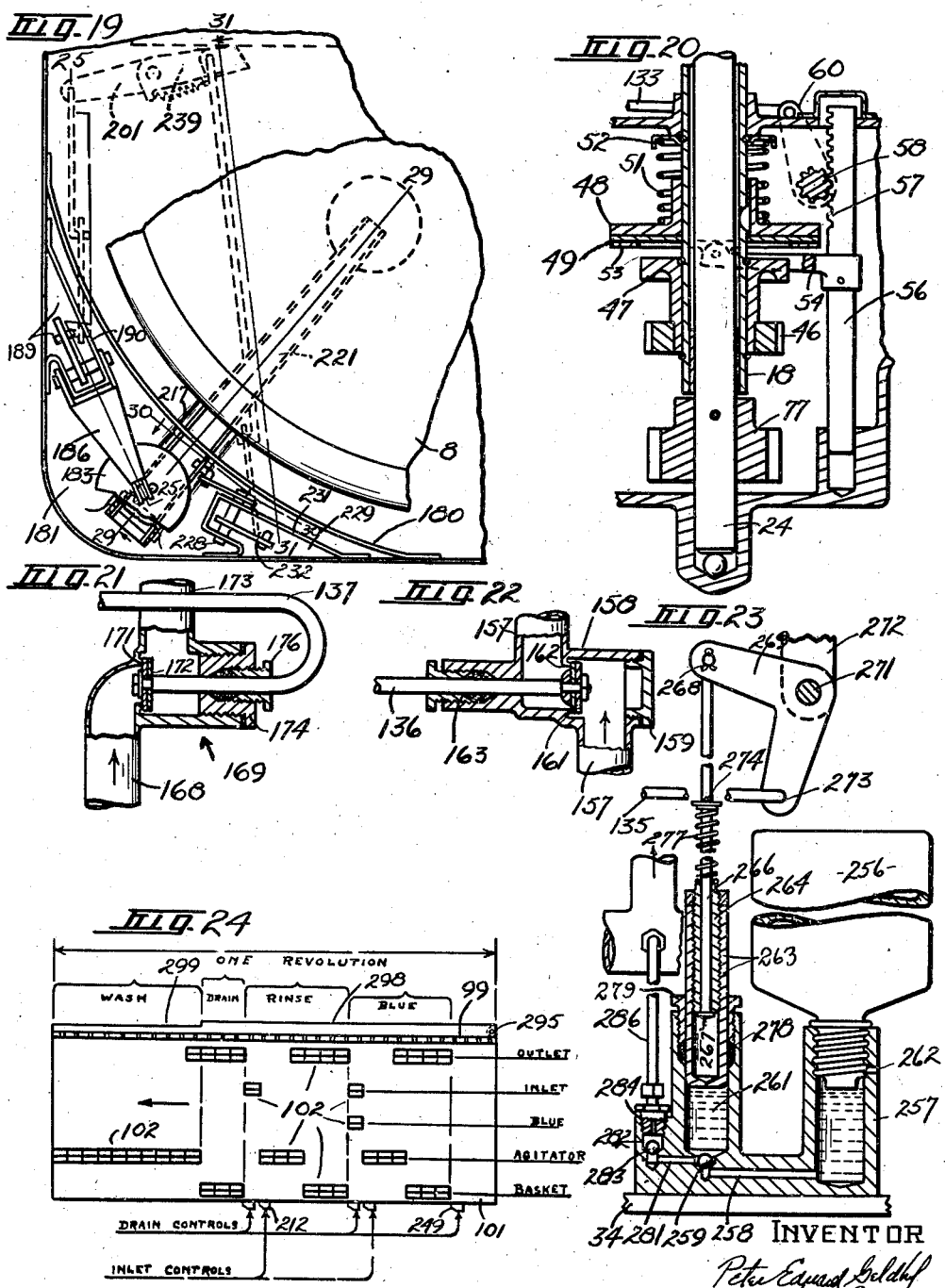

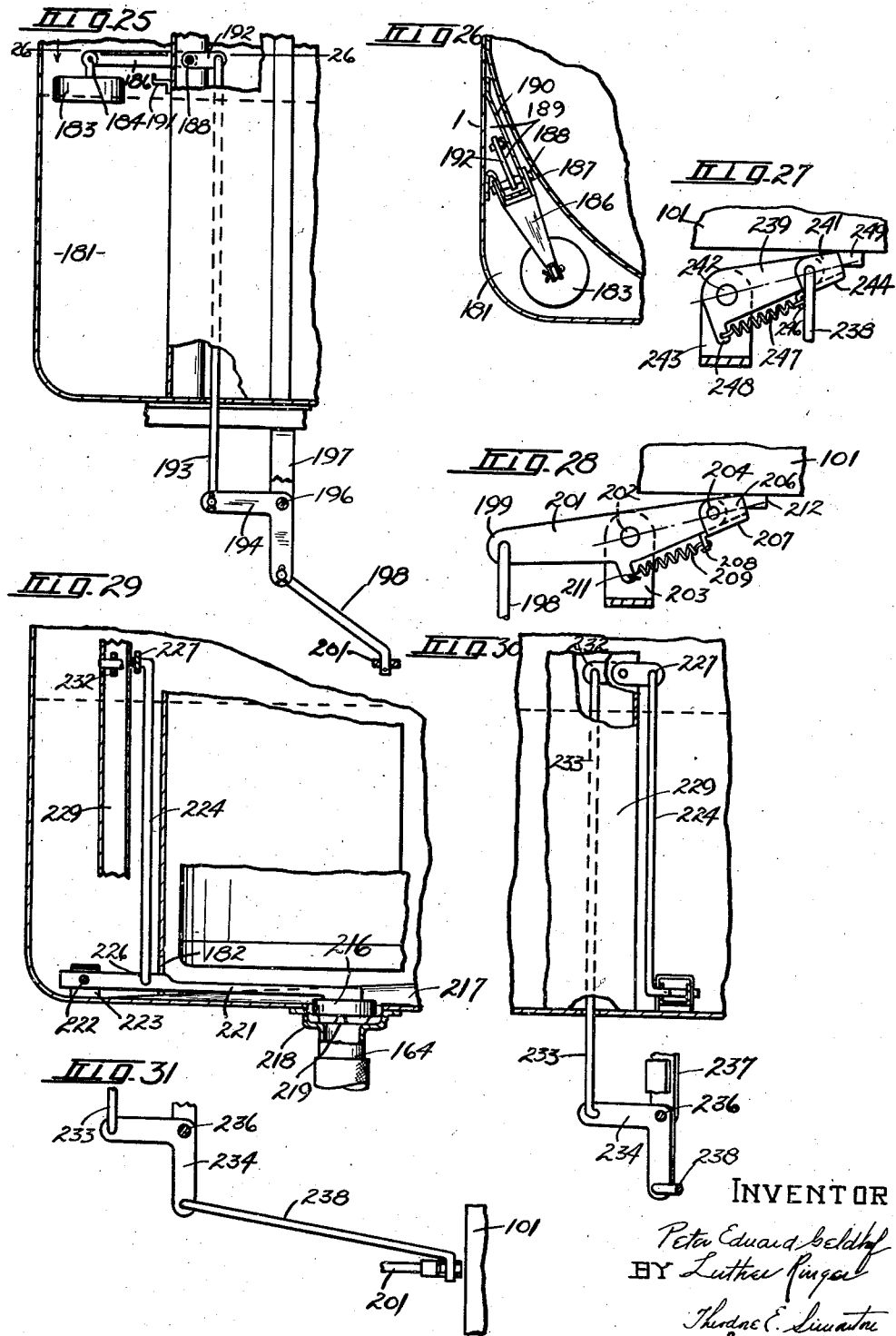

2,227,077

UNITED STATES PATENT OFFICE 2,227,077

AUTOMATIC CONTROL MECHANISM

Peter Eduard Geldhof, St. Joseph, Mich., and Luther Ringer, Syracuse, N. Y., assignors to Easy Washing Machine Corporation, Syracuse, N. Y., a corporation of Delaware Application March 26, 1937, Serial No. 133,274

10 Claims. (Cl. 137—68)

Our invention relates to domestic laundering machines.

An object of our invention is to provide a machine which, when set into operation, will, without further manual effort, operate to wash, rinse, blue and substantially dry the clothes and thereby condition them so that they may be then placed in the air for further drying or may, if desired, be immediately ironed while still in a damp condition.

Another object of our invention is to provide an automatic domestic laundering machine which, when the clothes have been placed in the washing tub or vat, may be set into operation, and without further manual effort or further attention on the part of the operator, will expeditiously perform the operations of washing, rinsing, bluing and substantially drying the clothes.

Another object of our invention is to provide, in an automatic domestic laundering machine, mechanism for automatically draining dirty water, rinse water or bluing water, at the proper time during the cycle of operation, from the tub or vat in which the clothes are placed.

A further object of our invention is to provide, in a domestic laundering machine adapted to perform automatically the operations of washing, rinsing, bluing and substantially drying the clothes, a novel mechanism for insuring the uniform distribution of bluing through the water flowing into the tub or vat in which the clothes are located.

Our invention further contemplates, in an automatic domestic laundering machine, the provision of a novel mechanism whereby, during the cycle of operation in which the clothes are brought from a dirty condition to a condition such that they may, if desired, be ironed, the cycle of operation may be interrupted, when necessary, to insure that liquid, in the vat or tub in which the clothes are located, will be completely drained therefrom prior to the commencement of a following operation requiring a change of liquid.

Our invention also contemplates, in an automatic domestic laundering machine, the provision of a novel mechanism whereby, during the cycle of operation in which the clothes are brought from a dirty condition to a condition such that they may, if desired, be ironed, the liquid, entering the tub or vat in which the clothes are located, will always reach the desired level before the commencement of the following operation.

Still another object of our invention is to provide an automatic laundering machine wherein the clothes, after being placed in the tub or vat, are, without further manual effort, washed, rinsed, blued and dried, and the provision of means whereby the cycle of operation during the washing portion thereof may be interrupted to enable the repetition or partial repetition of the washing portion of the cycle.

In addition, our invention contemplates the provision of an automatic domestic washing machine wherein the clothes, after being placed in the tub or vat, are, without further manual effort, through a novel timing mechanism and novel means set into operation by the timing mechanism, washed, rinsed, blued and dried.

More specifically, our invention contemplates the provision of a domestic laundering machine which, when the tub or vat has been filled with clothes and set into operation, will operate automatically thereafter to: wash the clothes for a selected predetermined period of time; drain the tub of dirty water including the dirty water held by the clothes; admit clean water for rinsing purposes; rinse the clothes; drain the tub of rinse water including the water held by the clothes; admit clean water with bluing uniformly distributed therethrough; blue the clothes; drain the tub of bluing water; and substantially dry the clothes so that they may be hung for additional drying or, if desired, immediately ironed.

Other objects and advantages of our invention will be more apparent from the following description when taken in connection with the accompanying drawings, in which:

Figure 1 is a view showing the general external appearance of our novel domestic automatic laundry machine.

Figure 2 is a view taken on the line 2—2 of Figure 1, in the direction indicated by the arrow, showing the construction of the interior of the laundering vat.

Figure 3 is a view taken on the line 3—3 of Figure 1, in the direction indicated by the arrow, showing a portion of the mechanism for operating our novel laundering machine.

Figure 4 is a view taken on the line 4—4 of Figure 2, showing the washing element, the rotatable clothes drying basket and part of the mechanism for operating the same.

Figure 5 is a view taken on the line 5—5 of Figure 6, in the direction indicated by the arrow.

Figure 6 is a view taken on the line 6—6 of Figure 3, showing the timing control drum and parts of the mechanism which are automatically set into operation upon rotation of the timing drum.

Figure 7 is a view taken on the line 7—7 of Figure 6, in the direction indicated by the arrow.

Figure 8 is a view showing a portion of the mechanism for driving the agitator and rotating the dryer basket.

Figure 9 is a view taken on the line 9—9 of Figure 6, in the direction indicated by the arrow, showing the dial and indicator for enabling the timing drum to be set at the proper point.

Figure 10 is a view taken on the line 10—10 of Figure 8.

Figure 11 is a view taken on the line 11—11 of Figure 4, showing the timing drum and the actuating elements operated upon rotation of the timing drum.

Figure 12 is a view taken on the line 12—12 of Figure 11, in the direction indicated by the arrow.

Figure 13 is a view showing one of the plates for retaining the strap on the eccentric.

Figure 14 is a view taken on the line 14—14 of Figure 6, in the direction indicated by the arrow, showing a portion of the mechanism set into operation upon rotation of the timing drum.

Figure 15 is a view taken on the line 15—15 of Figure 14, in the direction indicated by the arrow.

Figure 16 is a view taken on the line 16—16 of Figure 14, in the direction indicated by the arrow.

Figure 17 is a view taken on the line 17—17 of Figure 3, showing the gear reduction for the drum.

Figure 18 is a view taken on the line 18—18 of Figure 17, in the direction indicated by the arrow.

Figure 19 is a view showing a portion of Figure 2 on an enlarged scale and indicating in dotted lines the water inlet and drain controls.

Figure 20 is a view taken on the line 20—20 of Figure 3, showing parts of the agitator and basket drive.

Figure 21 is a view taken on the line 21—21 of Figure 3, showing the construction of the drain valve.

Figure 22 is a view taken on the line 22—22 of Figure 3, showing the construction of the inlet valve.

Figure 23 is a view taken on the line 23—23 of Figure 3, showing the construction of the mechanism for injecting bluing water into the washing vat.

Figure 24 is a view showing the drum unrolled and diagrammatically illustrating the operation of our novel machine.

Figure 25 is a view taken on the line 25—25 of Figure 19, showing the float control for the water inlet valve.

Figure 26 is a view taken on the line 26—26 of Figure 25, in the direction indicated by the arrow.

Figure 27 is a view showing mechanism for interrupting the operation of the timing drum should the drain valve be open and the liquid not completely emptied from the washing tub.

Figure 28 is a view showing the mechanism for interrupting the operation of the drum should the inlet valve be open and the float of Figure 25 not have reached the desired level.

Figure 29 is a view taken on the line 29—29 of Figure 19 showing a portion of the outlet valve control.

Figure 30 is a view taken on the line 30—30 of Figure 19 showing another portion of the outlet valve control.

Figure 31 is a view taken on the line 31—31 of Figure 19, showing still another portion of the outlet valve control.

Figure 32 is a view taken on the line 32—32 of Figure 5.

Figure 33 is a perspective view showing elements shown in Figure 32.

Figures 34 and 35 illustrate the mechanism by which the motor is automatically stopped at the end of the laundering cycle.

The machine of our invention, as shown in Figure 1, comprises, in general, a laundering vat 1, a plurality of legs 2 for supporting the vat, a cover 3, a skirt 4 and panels 6 extending completely around the machine and enclosing the operating mechanism. The panels 6 are removable to enable convenient inspection or repair of parts of the operating mechanism. The machine is preferably, generally square in shape and is provided with casters 7 to enable it to be readily moved from place to place.

As shown more clearly in Figure 4, mounted internally of the laundry vat 1, concentric therewith, is a rotatable basket 8. The clothes are placed in the basket and are left therein throughout the laundering cycle. The side walls 9 of the basket are perforated so that when the basket is rotated, at a comparatively high speed, by mechanism to be described, fluid from the clothes being dried is thrown outwardly by centrifugal force into the vat 1. The upper edge of the side walls 9 of the rotatable basket is turned inwardly, as indicated at 11, and may be rolled slightly for stiffening purposes. The lower edges of the side walls 9 are secured in any suitable manner, as indicated at 12, to a base member 13 which also may be perforated. The central portion of the base 13 is turned upwardly, as indicated at 14, and extends above the normal surface level in the vat. At its upper end, this portion of the basket has splines 16. The splines 16 are adapted to receive cooperating splines 17 formed near the upper end of a tubular drive shaft 18.

The washing element of our novel automatic laundering machine may comprise an agitator 19 which may be of any suitable construction. In the drawings, we have shown an agitator similar to that shown in Geldhof application Serial No. 55,050, filed December 18, 1935, although it will be understood that any suitable design of washing element may be used. Extending upward from the agitator 19 is a housing 21 which encloses the end of the hub 16 and the tubular drive shaft 18 for the basket. The housing 21, at its upper end, is formed into a hub 22, the internal bore of which is splined to receive cooperating splines 23 formed on the end of an agitator shaft 24.

The agitator shaft 24 extends downward internally of and concentric with the tubular drive shaft 18, the two shafts extending through an opening in the bottom of the laundry vat 1 and into a gear case 26. For supporting the tubular shaft 18, a supporting column 27 is provided which has a bearing 28 for the shaft at its upper end. At its lower end, the supporting column is provided with a flange 29 which engages the bottom of the vat, suitable packing being provided between the flange and the bottom of the vat for preventing leakage of fluid. The lower end of the supporting column 27 extends through the bottom of the vat and is threaded into a spider 31. Between the spider 31 and the bottom of the vat, a spacing plate 32 is provided so that when the supporting column is threaded into the spider 31, the entire assembly is rigid.

The spider 31 extends across below the bottom of the vat 1 and is secured, as indicated at 33, to the legs 2 of the laundry machine. The spider 31 serves to support the gear case 26 which is bolted thereto. Below the spider 31, as shown more clearly in Figure 3, is a metal supporting frame 34 which is tied to the legs 2 and serves to support a motor 36 and other parts of the mechanism to be described. The motor shaft 37 is provided at its outer end with a pulley 38, having a belt 39 which drives a pulley 41, rigidly secured to the end of a main shaft 42.

As shown more clearly in Figures 8 and 20, the main shaft 42 is provided with suitable bearings 43 in the gear case 26 and has a spiral gear 44 rigidly secured thereto which drives a gear 46 mounted on the tubular shaft 18. The gear 46 is rigidly secured to one element 47 of a clutch. The gear and clutch element are secured against longitudinal movement along the tubular shaft but both are rotatable with respect to the shaft. Rigidly secured to, but slidable along the tubular shaft 18, is a second clutch element 48 having a clutch facing 49. A spring 51, one end of which is held by a retaining member 52, normally presses the clutch element 48 into engagement with the clutch element 47.

A clutch shifter plate 53 is operatively connected to a shifter fork 54 which is rigidly secured to a rod 56. Movement of the rod carries the plate into and out of engagement with the clutch facing 49. When the basket is to be stopped, the rod is moved upward carrying the plate into engagement with the clutch facing and separating the clutch elements against the action of spring 51. The plate also serves as a brake when in its clutch disengaging position. The rod 56 has a rack portion 57 which is engaged by a pinion 58 which has a crank 60 rigidly secured thereto. The crank 60 is rotated by mechanism to be later described. Engagement of the clutch elements provides a friction drive for the rotatable basket through the tubular drive shaft 18. The construction of this clutch mechanism may be generally similar to that shown in Geldhof Patent No. 1,789,940, issued January 20, 1931.

The drive for the agitator, as shown more clearly in Figures 8 and 10, comprises a worm 59 mounted on the main shaft 42 which drives a worm gear 61. The worm gear 61 is mounted on a stub shaft 62 with respect to which the worm gear is rotatable. The worm gear is held in position by enlarging the end of the stub shaft 62, as indicated at 63, and is secured in a boss 64 in the casing 26 by a nut 66 threaded on the end of the stub shaft. A pin 67 is driven into the worm gear 61 eccentrically thereof and to the pin is rotatably secured a pitman 68. The opposite end of the pitman 68 is rotatably secured to a pin 69 driven into a segment 71. The segment has a circular opening adapted to receive a cam disk 72 which is rigidly secured to a pin 73 journaled in the casing 26. The pin 73 projects through the casing and the projecting end is secured to a crank 74 (see Figure 3). The crank 74 is actuated, by mechanism to be later described, to move gear teeth 76 of the segment 71 into and out of engagement with the teeth of gear 77 through the action of cam 72. When the teeth of segment 76 are in engagement with the gear 77, the normally rotating worm gear 61 through the pitman 68, drives the segment 71, which in turn drives the gear 77 which, through the agitator shaft 24, oscillates the agitator.

As shown in Figure 4, the shaft 42 projects through the casing 26 and into a casing 78 in which the shaft is suitably journaled. Mounted on or formed integral with the shaft 42 and within the casing 78 is a worm 79. The worm 79 is adapted to drive a worm gear 81 also mounted in the casing 78. The worm gear 81 is rigidly secured to a shaft 82 journaled in the casing 78. One end of the shaft 82 projects through the casing and is operatively connected to a shaft 83 by means of a coupling 84, as shown in Figure 3.

As shown more clearly in Figure 6, the shaft 83 extends through a supporting bracket 86 depending from the spider. The bracket 86 has a pair of long depending arms 87 and a plurality of short depending arms 88 in which the shaft is rotatably journaled and which, in turn, supports mechanism to be later described. The other end of the shaft 83 projects into a casing 89 and, at the projecting end, a pinion 91 is formed which, as shown in Figure 17, meshes with a large gear 92. The gear 92 is rigidly secured to a shaft 93 journaled in the casing 89, and on the shaft 93 is rigidly mounted a pinion 94. The pinion 94 meshes with a large gear 96 loosely mounted on a shaft 97 journaled in the casing, as shown in Figure 18. Keyed to the shaft 97 is a pinion 98 which meshes with a ring gear 99. The shaft 97 is driven, through the gear 96, by a friction drive which comprises a spring 95 and a plate 100 pinned to the shaft. The ring gear 99 is secured to a rotatable timing element or drum 101. The gear reduction, thus described, between the motor and the drum is such as to cause the drum to rotate at a speed of approximately two revolutions per hour.

The drum, as indicated in Figure 11 and as indicated diagrammatically in Figure 24, has five rows of stops or cams 102 on its periphery which are adapted to engage, as the drum rotates, actuating elements 103. Each of the cams 102 has a cam surface 104 for a purpose to be described. Each of the actuating elements 103 is associated with mechanism for setting into operation one of the devices for performing an operation on the clothes in the vat. For convenience, in referring to the actuating elements 103 and their associated mechanisms, the mechanisms, five in number, will be referred to by the letters A, B, C, D, and E. Mechanism A, as indicated diagrammatically in Figure 24, is adapted to start and stop the perforated drier basket upon operation of the actuating element 103A. Mechanism B is adapted to start and stop the agitator when the actuating element 103B is operated. Mechanism C is adapted to set into operation the bluing mechanisms D and E are adapted to control the operation of the fluid inlet and outlet valves respectively. Since each of the mechanisms A, B, C, D, and E is the same, a detailed description of one of them will be sufficient.

The actuating element 103, as shown in Figure 15, is mounted on a shaft 106 which is journaled in cross members 107 and 108. The cross member 107 lies across the top of the arms 87 and the cross member 108 extends across the arms 87 at the bottom thereof. The bottom cross member 108 may be formed in two parts bolted together for convenience in assembling.

Pinned to the shaft 106, near the lower end thereof, is a stop arm 109, and pinned to the upper end of the shaft 106 is a stop arm 111 which is bent and rebent to form a hook-shaped end 112. The stop arms 109 and 111 are offset from each other. A stop 110 limits the movement of the stop arms 109 and 111 under the action of a spring 115. On the shaft 83 is rigidly mounted a star wheel 113 which constitutes one element of a clutch. Adjacent the star wheel 113 and loosely mounted on the shaft 83 is a disk 114 which has pivotally secured thereto, at 116, a clutch element 117. The clutch element 117 is substantially a quarter circle and has a clutch tooth 118 adapted to engage the teeth 119 of the star wheel 113. The end of the clutch element 117 is bent, as indicated at 121, to form a stop portion 122 adapted to engage the stop arm 109 mounted on the shaft 106. A spring 123, having one end secured to the disk 114 and the other end secured to the clutch element 117, normally urges the clutch element 117 so that the clutch tooth 118 engages in one of the teeth of the star wheel 113. When the stop arm 109 is in engagement with the end 122 of the clutch element 117, the clutch tooth 118 is retained out of engagement with the teeth of the star wheel 113 against the action of the spring 123.

When the actuating element 103 is engaged by one of the cams 102 on the rotating drum, the actuating element 103 is rotated in a clockwise direction, as viewed in Figure 11, carrying with it the shaft 106 and the stop arm 109. Rotation of the stop arm 109 carries it out of engagement with the end 122 of the clutch element 117 permitting the spring to pull the clutch tooth 118 into engagement with one of the teeth of the star wheel 113. This causes rotation of the disk 114 together with the clutch element 117. Rotation of the shaft 106 against the action of the spring 115 carries the stop arm 111 into a position such that it will engage the end of the clutch element 117 when it reaches the dotted line position shown at 124. Actuation of the shaft 106 permits 180° rotation of the disk 114. When, upon continued rotation of the drum the cam 102 moves out of engagement with the actuating element 103, the shaft 106 is rotated, under the action of spring 115, in a counterclockwise direction, as viewed in Figure 11, until the stop arm 111 strikes the stop 110. This removes the stop arm from engagement with the end of the clutch element 117 and restores the stop arm 109 to the position shown in Figure 15. Under the action of spring 123, the clutch teeth 118 and 119 again engage and the disk 114 rotates through 180° until the end of the clutch element 117 engages the end of the stop arm 109.

As shown more clearly in Figures 6 and 16, the disk 114 has formed integral therewith a cam 127. The cam 127 has loosely mounted thereon an eccentric strap 128 which has formed integral therewith an arm 129. The eccentric strap is held in position on the cam 127 by a plate 131 which has cut out and bent portions constituting springs 132. When the plate 131 is screwed into position, as shown in Figure 6, it locks in position due to the spring elements and tends to prevent rotation of the cam element 127, with respect to the eccentric strap, in a counterclockwise direction, as viewed in Figure 16. This tendency for the cam 127 to rotate in a counterclockwise direction is caused by the spring 123 which, when the end of the clutch element 117 is against the stop 109, tends to pull the disk 114 together with the cam 127 in a counterclockwise direction, as viewed in Figure 15. If rotation of the disk should occur, it may carry the tooth 118 to a position such that no clearance exists between the constantly rotating star wheel and the clutch tooth 118 so that a clicking noise results.

Each of the arms 129 is secured to an actuating rod, the rods 133, 134, 135, 136 and 137. For the purpose of supporting the rods 133 to 137, inclusive, and their associated arms 129, a plurality of links 138 are mounted on a cross rod 139. The cross rod 139 is mounted in the depending arms 87 and serves not only as a support for the links 138 but also serves as a pivot point and support for the drum 101. Collars 141 are placed along the shaft 139 to space the links 138 from each other. Rotation of the clutch elements 117 from the position shown in Figure 15 to that indicated in dotted lines in that figure moves the rods 133 to 137, inclusive, to the right as viewed in Figure 14, and rotation of the clutch elements 117 from the dotted line position, indicated in Figure 15, to the solid line position of that figure moves the rods 133 to 137 to the left.

The support for the drum is more clearly shown in Figures 6 and 7. In addition to the cross rod 139 which extends through the depending arms 87, is a shaft 142 having cams 143 rigidly secured thereto. The shaft 142 is journaled in the depending arms 87 and the cams 143 are rotatable in depending supporting brackets 144. The end of the shaft 142 is square, as indicated at 146, and is adapted to receive a hand operating element 147, the end of which may be inserted through an opening in the skirt 4.

Journaled in the lower end of the supporting brackets 144 is a shaft 148 upon which the rotatable drum 101 is supported. The drum is keyed to the shaft, as indicated at 149. When the hand control element 147 is turned through 180°, as indicated in dotted lines in Figure 7, the drum 101 is lowered by swinging the supporting brackets 144 about their pivoting cross rod 139. Movement of the supporting brackets 144 lowers the drum, as indicated in dotted lines in Figure 7, which carries the ring gear 99 out of engagement with its driving pinion. Lowering of the drum also carries the stops 102 out of engagement with the actuating elements 103, thereby permitting any of the clutch elements 117 which may be in the dotted line position, shown in Figure 15, through the continued rotation of the motor to be returned to the solid line position.

On the end of the shaft 148 is secured a pointer 151 which is adapted to indicate the position of the drum on a disk 152. The disk 152 may be suitably divided into minutes or in any other way calibrated to show the position of the drum. The disk 152, which lies on the outside of the machine so as to be visible to the operator, has a sleeve 153 formed integral with the disk, and the sleeve is secured, in any suitable manner, to the outer supporting bracket 144, as indicated at 154. A slot 156, shown in dotted lines in Figure 9, is cut in the outer panel of the machine so that when the drum is lowered by rotating the hand control element 147, the shaft 148, together with the sleeve 153 carrying the disk 151, will move in the slot so that lowering of the drum does not disturb the relative position of the pointer 151 with respect to the disk 152.

Water is brought to the washing vat through a pipe 157, shown in Figures 4 and 22, which is connected to the water main. Water enters from the pipe 157 into a valve or mixing chamber 158, which has an opening to enable convenient cleaning of the valve. The opening is covered by a cap 159. A suitable water valve 161 is secured on the end of the rod 136 and is adapted to close the inlet passage when on its valve seat 162. Packing and a packing nut surround the rod 136 and close the opening through which the rod 136 passes into the valve chamber and prevent leakage of water from the chamber. The inlet pipe 157 extends upward from the valve chamber 158 and extends through an opening in the bottom of the vat. It will be understood that actuation of the rod 136 opens and closes the valve 161 to admit and cut off the flow of water to the vat.

Fluid is emptied from the washing vat through a pipe 164, shown in Figure 3, which is connected to the suction side of a pump 166. The pump is driven by a pulley 167 driven from the belt 39. The discharge of the pump passes through a pipe 168 to a discharge valve, generally indicated by the numeral 169, shown in Figure 21. The pipe 168 is bent to form a seat 171 for a valve 172. The valve is suitably secured to rod 137 which is bent upon itself, as shown in Figure 21. An opening is provided in the valve 169 which is closed by a suitable cap 174, and the rod 137 extends through the cap. Suitable packing, provided around the rod 137, is held in position by a packing nut 176. It will be understood that actuation of the rod 137 opens and closes the drain valve and enables the fluid to pass out of a pipe 173 to waste.

In order to control the valves 161 and 169 so that they will close at the proper time, floats are provided which are controlled by the liquid level in the washing vat. In one corner of the vat, as shown in Figure 19, is a dividing wall 180. The dividing wall extends from well above the normal surface level of liquid in the vat to a point shown at 182 in Figure 29 near the bottom of the vat. The dividing wall 180 forms a compartment 181 to which the water in the vat has access.

The inlet level float 183 is mounted in the compartment 181 and is pivotally connected at 184 to an arm 186. The end of the arm 186 is bifurcated, as shown at 187, and the ends are secured to a pivot rod 188. The pivot rod 188 extends through a compartment 189 which is built in the compartment 181. The compartment 189, formed by a sheet metal enclosure 190 suitably welded to the side walls 1 of the vat, is made water-tight. A stop 191 limits the downward movement of the arm 186. An arm 192 is rigidly secured to the pivot rod 188 and has secured to the end thereof a rod 193 which extends downward through the water-tight compartment 189. The rod 193 extends through the bottom of the vat and the end thereof is pivotally secured to one arm of a bell crank 194. The bell crank 194 is pivoted, at 196, to a bracket 197 depending from the spider 31. To the other arm of the bell crank, a rod 198 is pivotally secured which is pivoted at 199 to a lever 201. The lever 201 is pivoted at 202 to a bracket 203 suitably supported from the frame. To the end of the lever 201 is secured an end piece 206. The end piece 206 has an angular extending portion 207 which engages the side edges of the lever 201. An ear 208, extending from the end piece, has one end of a spring 209 secured thereto. The other end of the spring is secured to an ear 211 formed integral with the lever 201.

On the side wall of the drum, as shown in Figure 4, are formed a plurality of stops 212 which are spaced in accordance with the desired operation. When the inlet water valve 161 is opened, the water level rises in the vat. To prevent the valve from being closed by operation of mechanism D prior to the water reaching the proper level, the stop 212 on the drum engages the end piece 206 and the drum is prevented from rotating, the friction drive provided by the spring 95 and the plate 100 enabling slippage. When the water in the vat reaches the desired level, the float rises and moves the rod 193 downward which causes movement of the bell crank 194 in a counterclockwise direction, which pushes on the rod 198 upward as viewed in Figure 28. Upward movement of the rod 198 pivots the lever 201 about the pivot 202, breaking the toggle formed by the lever 201 and the end piece 206 against the action of spring 209. Continued upward movement of the rod 198 carries the end piece 206 out of engagement with the stop 212, permitting the drum to continue its normal rotation. If, however, the washing vat has filled with liquid during the normal space of time allotted for such filling by the length of inlet valve cam 102, the float, upon reaching its upper position, will cause upward movement of the rod 198. Under these conditions, the end piece 206 will have been carried out of position to be engaged by the stop 212, prior to the time the stop reaches the position shown in Figure 28.

The outlet valve float 216 is mounted near the bottom of the vat below the rotatable basket 8. The float 216 lies in a depressed portion or channel formed in the vat, indicated at 217, so that the liquid will flow into the channel as the vat is emptied. The outlet pipe 164 has an enlarged end 218, welded or otherwise secured to the bottom of the vat, for the reception of the float. A projection 219, extending inwardly from the pipe 164, prevents the float from seating so as to close the outlet opening. A lever 221, secured to the float, extends along the bottom of the channel 217 and through the opening in the bottom of the compartment 181 toward the side of the vat where it is pivoted, as indicated at 222, to a bracket 223.

A rod 224, secured to the lever 221 at 226, extends upward through the compartment 181 above the normal liquid level in the vat and has its upper end secured to an arm 227. The arm 227 is rigidly secured to a pivot pin 228 which extends through two walls of a water-tight compartment 229 formed of sheet metal 231 welded to the side walls of the vat. Rigidly secured to the pivot pin 228 is an arm 232 to the end of which is secured a rod 233. The rod 233 extends downward through the water-tight compartment 229 and through an opening in the bottom of the vat. The projecting end of the rod is pivoted to one arm of a bell crank 234. The bell crank 234 is pivoted, at 236, to a bracket 237 secured to the frame of the machine. To the other arm of the bell crank is secured a rod 238, the upper end of which is shown in Figure 27. The upper end of the rod 238 extends through apertures formed in a lever 239 and an end piece 241. The lever 239 is pivoted at 242 to a bracket 243 suitably supported from the frame of the machine. The end piece 241 has an angular extending portion 244 adapted normally to engage the side edge of the lever 239. An ear 246, formed on the end piece 241, has one end of a spring 247 secured thereto. The other end of the spring is secured to an ear 248 on the lever 239.

The end piece 241 is engageable by any one of a series of stops 249 on the side of the drum (see Fig. 4) should the vat not have completely drained during the normal time allowed in the cycle for such drainage to occur. If the vat has not drained after the drain valve 169 has been opened by mechanism E, the parts will be in the position shown in Figure 27 with the stop 249 in engagement with the end piece 241. This engagement will stop the rotation of the drum through the friction clutch 95—100 and retain the outlet valve open. As soon as the vat has drained, the float 216 will reach the position shown in Figure 29 depressing the rod 224 and raising the rod 233. This will cause a downward movement on the rod 238, as viewed in Figure 27, which will break the toggle formed by the lever 239 and the end piece 241 and carry the end piece 241 out of engagement with the stop 249, permitting the drum to continue its rotation. Should the vat have completely drained prior to the stop 249 reaching the end piece 241, the rod 238 will have moved the end piece out of the way prior to the stop 249 reaching the end piece and the rotation of the drum will not be interrupted.

Mechanism is provided for automatically injecting bluing into the vat with the inlet water for the purpose of bluing the clothes during the laundering cycle. This mechanism is shown in Figure 23 and comprises a pump and bluing feed supply mounted on the supporting frame 34. A bluing container 256 is screwed into a threaded opening in a supply chamber 257 with the opening in the container extending downward. Bluing fluid runs out of the container and into a horizontal passage 258, past a check valve 259 and into the pump cylinder 261. A vent 262 is provided to supply air to the container 256 to replace the bluing flowing into the supply chamber 257 and the pump cylinder 261 from the container. As soon as the pump cylinder 261 and the supply chamber have filled with bluing, the container seals itself at the level shown in Figure 23.

The pump cylinder 261 has reciprocable therein a plunger 263 which has a hollow bore, a portion of which is threaded to receive a threaded member 264. The threaded member has extending through the center thereof a pump rod 266, the lower end of which is enlarged, as indicated at 267, and the upper end of which is pivotally secured, at 268, to one arm of a bell crank 269. The bell crank 269 is pivoted, at 271, to a bracket 272 and the other arm of the bell crank is secured, at 273 to rod 135 which is operated by mechanism C. A pin 274 extends through the pump rod and has a collar 276 lying below it which serves as a stop for a spring 277. The other end of the spring engages the top of the threaded member 264. Packing 278 extends around the plunger 263 and is held in place by a packing nut 279. Adjustment of the threaded member 264 with respect to the plunger 263 will regulate the amount of bluing drawn into the pump cylinder 261 and thereby regulate the amount of bluing injected into the vat.

A passage 281 leads from the lower end of the pump cylinder 261. The passage 281 takes a right angle turn and, at 282, is enlarged to provide a seat for a ball 283 which serves as a check valve to prevent return of bluing to the pump cylinder. A fitting 284, having a small aperture 285 therein constituting a resistance unit, is threaded into the opening in the valve chamber and a pipe 286 is secured in the fitting. The other end of the pipe has entrance to the inlet valve chamber or mixing chamber 158, as shown in Figures 3 and 4.

Assuming the level of the bluing in the pump cylinder 261 is as shown in Figure 23, when mechanism C is actuated, rod 135 is pushed to the right, as viewed in Figure 23, which causes a downward movement on the pump rod 266. Downward movement of the pump rod compresses the spring 277 against the resistance offered to downward movement of the plunger 263 by the bluing fluid 261 attempting to flow out of the small aperture 285 through the fitting 284. This resistance enables the spring to be compressed considerably without causing much liquid flow from the pump cylinder 261. Simultaneously with the flow of bluing caused by the operation of the bluing pump, water is flowing through the inlet pipe 157 into the vat, the inlet valve 161 having at that time been opened by operation of mechanism D. Bluing is gradually injected into the inlet water as it flows through the mixing chamber 158. After the pump rod has moved to its extreme downward position, expansion of the spring 277 will continue to supply bluing slowly through the small aperture 285 in the fitting 284 into the pipe 286 and thence into the mixing chamber 158. Bluing is thus gradually supplied to the mixing chamber which enables uniform distribution of the bluing throughout the water entering the vat, thereby eliminating the possibility of bluing the clothes unevenly or causing blue splotches in the clothes. As soon as the bluing operation is completed, the rod 135 is drawn to the left drawing the pump rod 266 upward. The plunger 263 then moves on a suction stroke and bluing is drawn from the container 256 into the pump cylinder 261. The device is then, when required, ready for another bluing operation.

As shown in Figures 34 and 35, means are provided for automatically stopping rotation of the drum at the end of the cycle of operation. A switch element, generally indicated by the numeral 291, comprises a pair of contacts 292 mounted in a switch box carried by supporting bracket 144. A contact element 293 is rigidly secured to a pivot rod extending outside the box. The pivot rod is rigidly secured to a bell crank 294. The contact element 293 is normally adapted to bridge the contacts and maintain the motor in operation. A switch cam 295, carried by the drum, engages one arm of the bell crank, at the end of the cycle of operation, and removes contact element 293 from its bridging position, against the action of a spring 296. One end of the spring is secured to the other arm of the bell crank and the other end of the spring is secured to an arm carried by the switch box. The switch including the motor circuit is shown diagrammatically in Figure 35. If desired, a second switch 297 may be placed in the motor circuit, which may be opened when the drum is set to start a new cycle, to prevent the motor from operating before the water and clothes have been placed in the tub and the drum is properly set to initiate the laundering cycle.

As described above, means are provided for enabling the drum to be lowered to disengage the pinion 97 from the ring gear 99. This is to enable the rotation of the drum backward, upon rotation of the pointer 151, to permit a repetition of the whole or any part of the washing period in the event that the operator is of the opinion that the clothes have not been washed sufficiently. In the event that the operator should drop the drum during any portion of the laundering cycle other than the washing portion thereof, means are provided for preventing restoration of the drum to operating position unless the operator rotates the drum back to the washing portion of the cycle. Such means comprise a flange 298 on the drum which has a cut out portion 299 of a length equal to the amount of rotation of the drum during the washing period. If desired, as indicated in Figure 32, the flange 298 and the gear 99 may be formed integral. A plate 301, carried by the cross member 108, extends downward and has a projecting ear 302. The ear 302 lies in a recess 303 formed in a plate 304 which faces against the plate 301. A headed bolt 306 extends through both plates and the projecting end is encircled by a spring 307. A stop 308 is rigidly secured to the bolt backs of the spring so that the spring presses the two plates together. The plate 304 has an inwardly extending lower end 309 which normally lies below the flange 298 on the drum.

When the drum is lowered, rotated and raised while the end 309 of the plate 304 is in registry with the cut out portion 299 of the flange 298, the end 309 offers no interference to the movements of the drum. If, however, the operator lowers the drum during any other portion of the cycle, the flange 298 cams aside the end 309 of the plate 304 against the action of spring 307. When the drum reaches its lowered position, the end 309, due to the action of the spring, lies above the flange and prevents the drum from being restored to its normal position. This construction prevents the possibility of the operator, for example, lowering the drum when the vat is filled with water, turning the drum and raising it into such position that the inlet actuating element 103D is operated with the consequent possibility of flooding the tub. At the same time, this construction permits the operator should she, for example, note at the end of the rinsing period that the clothes still appear dirty, to lower the drum, rotate it to the portion of the drum representing the washing period, and then raise the drum to operative position. Upon filling the tub with washing fluid, she may then repeat the whole or any portion of the washing period.

The operation of our novel automatic washing machine may, perhaps, be made more clear by referring to Figure 24. In Figure 24, the spaces between vertical lines on the diagrammatically illustrated cams 102 represent minutes. The vat 1 is first filled with hot water by means of a hose attached to the water faucet (not shown), soap added, and then the clothes to be washed are immersed in the perforated basket. The operator then observes the position of the pointer 151 with respect to the dial 152 and, if not in the proper position, she may set the machine by dropping the drum, rotating the pointer and thereby the drum to the desired position and then restoring the drum to its normal position. We have shown in Figure 9 the dial graduated for a ten-minute normal washing period, although this may be varied if desired. If the operator wishes to wash the clothes only eight minutes, she rotates the pointer and thereby the drum 101 until the pointer registers with the figure 2 on the dial. After the machine has been set for the desired washing period, switch 297 may be closed and the motor starts to rotate. Upon rotation of the drum, the agitator cam 102 rotates the agitator actuating element 103 which sets into operation mechanism B upon operation of the motor. Actuation of mechanism B moves the rod 134 to the right, as viewed in Figure 14. Movement of the rod 134 to the right, rotates the cam 72 and brings the rack teeth 76 into engagement with the pinion 77, which starts the agitator oscillating with the perforated basket in a stationary condition. The agitator oscillates for the period for which it has been set, for example, eight minutes.

Prior to the completion of the washing period, for example as indicated in Figure 24, one minute prior to the completion of the washing period, outlet valve cam 102 engages outlet valve actuating element 103 setting mechanism E into operation, thereby moving rod 137 to the right, as viewed in Figure 14, and opening drain valve 169. The drain valve, as indicated in Figure 24, remains open at least four minutes. At the end of the washing period, the agitator cam 102 has moved out of engagement with the agitator actuating element 103, and mechanism B is operated to move rod 134 to the left, as viewed in Figure 14, which automatically stops the agitator. At substantially the same time, as indicated in Figure 24, basket cam 102 engages basket actuating element 103, setting into operation mechanism A which moves rod 133 to the right, as viewed in Figure 14. Movement of the rod 133 to the right rotates pinion 58, moving rod 56 downward and enabling engagement of clutch elements 47—48 which starts rotation of the basket. Thus, while the drain valve is open, the basket is being rotated, throwing the dirty washing fluid off the clothes by centrifugal force and permitting it to flow out of the drain valve 169 to waste. Pump 166, which is operating at all times, during the operation of the motor, aids in emptying the vat. At the end of four minutes, the drain valve is closed through the actuation of mechanism A and the basket is stopped through the actuation of mechanism E.

Under certain conditions, the washing fluid may not have completely drained from the vat during the allotted time. Prior to permitting rinse water to flow into the vat it is desirable that the vat be completely drained of washing fluid. This is accomplished through the drain valve float 216 which, as described above, through the mechanism shown in Figure 27, stops rotation of the drum until the float 216 has reached the position shown in Figure 29. Stopping rotation of the drum retains the drain valve open and the basket rotating with the wash water has completely drained. After the washing fluid has completely drained from the washing vat, as indicated in Figure 24, mechanisms A and E are actuated to stop rotation of the basket and close the drain valve. Substantially simultaneously inlet valve cam 102 engages inlet valve actuating element 103 which sets into operation mechanism D, thereby opening the inlet valve 161 permitting the entrance of clean water into the vat for rinsing the clothes. Normally, the inlet valve is retained open for one minute, during which time, under normal conditions, the rinse water will reach the desired level. However, should the float 183 not have reached its uppermost position during the allotted time, rotation of the drum will be stopped through the mechanism shown in Figure 28 as described above. As soon as the float 183 reaches its upper position, rod 198 will be moved upward, breaking the toggle formed by the lever 201 and the end piece 206. The end piece is then carried out of engagement with the stop 212 permitting the drum to continue its rotation and mechanism D is then actuated to close the inlet valve.

As indicated in Figure 24, as soon as the vat is filled to the proper level with rinse water, agitator cam 102 engages agitator actuating element 103 which sets into operation mechanism B and thereby starts the agitator oscillating. Operation of the agitator with rinse water in the vat thoroughly agitates the rinse water and clothes and insures that all the soapy washing fluid will be removed from the clothes. The agitator is operated for three minutes during the rinsing period of the cycle but, prior to the completion of the rinsing period, the outlet valve is opened by outlet valve cam 102 engaging outlet valve actuating element 103, which actuates mechanism E and opens the outlet valve 109. Shortly after the outlet valve opens, the agitator is stopped and the basket is rotated upon actuation of mechanism A. The rinse water is thereby expressed from the clothes by centrifugal force. As indicated in Figure 24, the drain valve is normally retained open again for four minutes and the basket operated three minutes. The basket is then stopped and the outlet valve moved to the closed position. Should the rinse water not have completely drained from the vat, as previously described, the mechanism shown in Figure 27 operates to stop rotation of the drum until the rinse water has completely drained from the vat.

After the rinse water has drained from the vat, inlet valve cam 102 and bluing cam 102 engage, respectively, inlet valve actuating element 103 and bluing actuating element 103, thereby setting into operation mechanisms D and C and thereby operating the bluing pump shown in Figure 23, the operation of which has previously been described. Bluing fluid is slowly injected into the mixing or valve chamber 168 as the inlet water flows into the vat. Because of the construction of the bluing pump and the small orifice in the fitting 284, the bluing fluid flows very slowly into the mixing chamber, insuring thorough mixing of the bluing fluid with the inlet water and thereby preventing the uneven bluing of the clothes or the forming of blue splotches in parts of the clothes. With the bluing fluid in the vat, as indicated in Figure 24, the agitator is then operated for a period of three minutes, insuring the thorough mixing of the bluing fluid and clothes.

Prior to stopping the agitator, the outlet valve is opened, permitting the bluing fluid to drain from the vat. When the agitator is stopped, as indicated in Figure 24, the basket is rotated to throw the bluing fluid out of the clothes by centrifugal force and thereby dry the clothes. As before, the drain control, operating through the float 216 and the mechanism shown in Figure 27, prevents closing of the drain valve and stopping of the basket until the bluing fluid has completely drained from the vat. Switch cam 295 then engages bell crank 294 to stop the motor through switch 291. The clothes, at the end of this time, have been passed through a complete cycle and are ready to be hung in the air for further drying or, if the housewife desires, she may take the damp clothes from the vat and immediately iron them. After the clean, substantially dry clothes have been removed from the basket, the machine may be again filled with another load of dirty clothes and the cycle repeated.

It will be particularly noted that when once set into operation, the machine requires no further attention and the housewife may leave the machine and go about other duties. The machine will automatically shut off after completion of the cycle and the housewife may return to the machine, at her convenience, to remove the clothes from the basket. As mentioned above, if the housewife desires to repeat the washing portion of the cycle, she may do so by dropping the drum and rotating the dial 151 to the point desired and restoring the drum to its normal position.

It will be appreciated that various changes and modifications may be made in our automatic laundering machine and that the timing of the various operations may be readily changed in accordance with a desired operation. We, therefore, do not wish to limit our invention to the precise mechanism and operation shown and described, as changes may be made therein without departing from the spirit of the appended claims.

We claim:

1. In a control mechanism for governing a cycle of operations in an automatic washing machine or the like having an operating element, wherein said control mechanism includes a rotatable element independent of said operating element on which is mounted a plurality of camming means, a plurality of trip means adapted to be operated by said camming means, and power means for rotating said rotatable element, the combination of a plurality of power clutches for operating individual controls, said clutches being adapted for selective operation by said trip means when said rotatable element is rotated independently of said operating element.

2. In a control mechanism for governing a cycle of operations in an automatic washing machine or the like, wherein said control mechanism includes a rotatable element on which is mounted a plurality of camming means, a plurality of trip means adapted to be operated by said camming means, and power means for rotating said rotatable element, the combination of a plurality of partial revolution clutches for operating individual controls, each of said clutches being constructed and arranged so that a partial revolution of a clutch initiates a specific operation in the cycle while the subsequent completion of said revolution terminates said specific operation, said clutches being adapted for selective operation by said trip means when said rotatable element is rotated.

3. In a control mechanism for governing a cycle of operations in an automatic washing machine or the like, wherein said control mechanism includes a rotatable element, a plurality of camming means mounted on said element and arranged to define a complete cycle of operations in substantially one revolution of said rotatable element, trip means adapted to cooperate with said camming means, power means, and a speed reducing train for transmitting motion from said power means to said rotatable element, the combination of an intermediate shaft in said speed reducing train so constructed and arranged that its angular velocity is substantially greater than the angular velocity of said rotatable element, a plurality of partial revolution clutches, each of said clutches comprising a driving element fixedly mounted on said intermediate shaft, a driven element adapted to be brought into and out of cooperative engagement with said driving element through the operation of said aforementioned trip means, and a plurality of means adapted to cooperate with said driven elements of said partial revolution clutches, said last mentioned means being so constructed and arranged as to control individual operations in said cycle whereby individual operations are initiated and terminated by the comparatively rapid rotation of said partial revolution clutches.

4. In a control mechanism for governing a cycle of operations in an automatic washing machine or the like, wherein such machine has a vat for containing liquid, wherein said cycle of operations includes periods when said vat is filled with liquid to a normal level and other periods when said vat is emptied, and wherein said control mechanism includes a rotatable element, a plurality of camming means mounted thereon, a plurality of individual control mechanisms adapted to be operated by said camming means when said rotatable element is rotated, power means for rotating said rotatable element and a clutch interposed between said power means and said rotatable element, the combination of means so constructed and arranged as to arrest the rotation of said drum and a plurality of floats adapted to be operated by the liquid level in said vat, said floats being so constructed and arranged as to control said last mentioned means whereby the cycle of operations goverend by said camming means is interrupted when the level of liquid in said vat is below normal during a period of said cycle of operation when a normal liquid level is required, and the cycle of operations is also interrupted when said liquid remains in said vat when the period of the cycle of operations requires said vat to be emptied.

5. In a mechanism as described in claim 4, the combination in which said means for arresting the rotation of said rotatable element comprises a set of stops mounted on said rotatable element in predetermined relation to said camming means, and a plurality of movable catch pieces so constructed and arranged as to engage and release said stops.

6. In a control mechanism for governing a cycle of operations in an automatic washing machine or the like, wherein such machine has a vat for containing liquid and an inlet for filling said vat, said control mechanism including a rotatable element on which is mounted a plurality of camming means, a plurality of trip means adapted to be operated by said camming means, power means for rotating said rotatable element, and a clutch interposed between said power means and said rotatable element, the combination of a plurality of power clutches for operating individual controls, said clutches being adapted for selective operation by said trip means when said rotatable element is rotated, a set of stops mounted on said rotatable element in predetermined relation to the aforementioned camming means, a movable catch piece so constructed and arranged as to engage and release said stops, a float mounted in said vat and linkage mechanism for transmitting motion from said float to said movable catch piece, whereby rotation of said rotatable element is arrested when said float is in a position below that corresponding to a normal filling of said vat with liquid, and operation of said power clutches is thereby prevented while such condition exists.

7. In a control mechanism for governing a cycle of operations in an automatic washing machine or the like, wherein such machine has a vat for containing liquid and an outlet for draining said vat, and wherein said control mechanism includes a rotatable element on which is mounted a plurality of camming means, a plurality of trip means adapted to be operated by said camming means, and power means for rotating said rotatable element, the combination of a plurality of power clutches adapted to be selectively operated by said trip means when said rotatable element is rotated, said power clutches being constructed and arranged to transmit power for operating individual controls, a set of stops mounted on said rotatable element in predetermined relation to said camming means, a movable catch piece so constructed and arranged as to engage and release said stops, a submerged float and linkage mechanism for transmitting motion from said float to said catch piece so constructed and arranged as to move said catch piece into and out of engagement with said stops, whereby rotation of said rotatable element is arrested when said float is raised by liquid in said vat and the operation of said power clutches is thereby prevented while such condition exists and until said vat is emptied of liquid.

8. In a control mechanism for governing a cycle of operations in an automatic washing machine or the like, wherein said control mechanism includes a rotatable element having means mounted thereon for controlling portions of said cycle and power means for rotating said element, in combination, means so constructed and arranged that said rotatable element may be disconnected from said power means, and means comprising a handle affixed to said rotatable element whereby said rotatable element may be manually rotated backward to repeat a portion of said cycle of operations at the will of the operator.

9. In a control mechanism for governing a cycle of operations in an automatic washing machine or the like, wherein said control mechanism includes a rotatable element, a plurality of camming means mounted on said element, a plurality of means so constructed and arranged as to cooperate with said camming means for controlling operations within said cycle, and power means for rotating said rotatable element, the combination of driving means comprising at least one driving member and one driven member normally held in cooperative relation to each other for transmitting motion from said power means to said rotatable element, supporting means for said rotatable element so constructed and arranged that said rotatable element may be moved out of and into cooperation with said means for controlling operations within the cycle, while at the same time moving said driving member out of and into cooperation with said driven member of said driving means, and manually operated means for rotating said rotatable element either backward or forward when said rotatable element is moved out of cooperative relation with said means for controlling operations within said cycle, whereby any portion of a cycle of operations may be repeated at the will of the operator.

10. In a control mechanism for governing a cycle of operations in an automatic washing machine or the like, wherein said control mechanism includes a rotatable element, camming means mounted on said element, and means automatically set into operation by said camming means as said element rotates for controlling portions of said cycle, in combination, means for moving said element to a position such that said camming means are out of operative position relative to said means for controlling portions of said cycle to enable the element to be rotated back to a previous position and then restored to a position such that the camming means are again in an operative position.

PETER EDUARD GELDHOF.
LUTHER RINGER.